June 16, 1942.   E. MOREHOUSE   2,286,635
SAFETY CATCH
Filed May 13, 1940
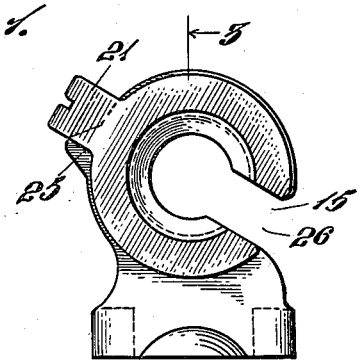
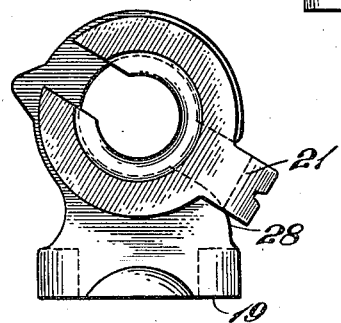
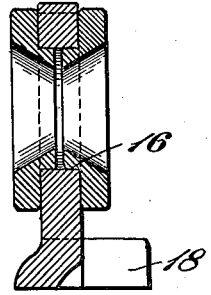
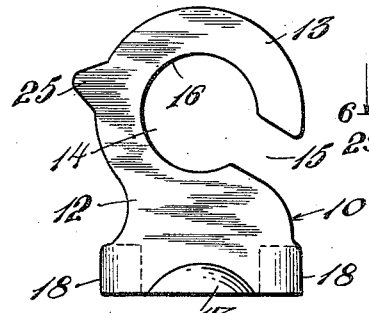
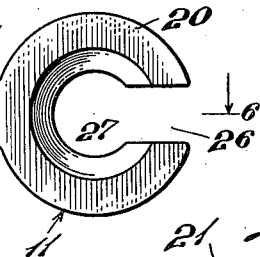
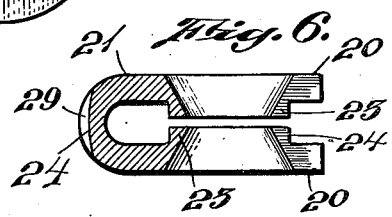
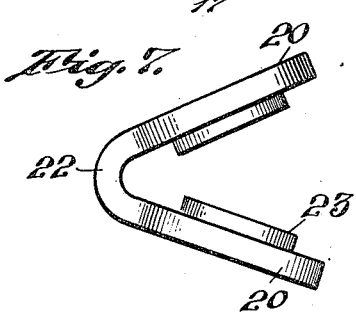
INVENTOR.
Eugene Morehouse
BY Barlow & Barlow
ATTORNEYS.

Patented June 16, 1942

2,286,635

UNITED STATES PATENT OFFICE 2,286,635

SAFETY CATCH

Eugene Morehouse, Providence, R. I., assignor to B. A. Ballou & Co., Inc., a corporation of Rhode Island Application May 13, 1940, Serial No. 334,684

2 Claims. (Cl. 24—157)

This invention relates to a safety catch, more particularly to the rotor member thereof; and has for one of its objects to provide a rotor member which will be assembled correctly regardless of whether one of its faces or its opposite face is on a particular side of the catch.

Another object of the invention is to provide a rotor member which has a handle and a slot so related that an operator cannot make a mistake in the assembly thereof to cause its slot to align with the slot in the other safety catch member when in one position of rotation.

Another object of the invention is to provide a rotor member which may be automatically assembled in a machine without regard to one side or the opposite side being in a chosen position.

With these and other objects in view, the invention consists of certain novel features of construction, as will be more fully described, and particularly pointed out in the appended claims.

In the accompanying drawing:

Fig. 1 is a side elevation of the safety catch in open position;

Fig. 2 is a view similar to Fig. 1 with the catch in closed position;

Fig. 3 is a section on line 3—3 of Fig. 1;

Fig. 4 is an elevation of the member attached to an article upon which the catch is assembled;

Fig. 5 is an elevation of the rotor member alone;

Fig. 6 is a section on line 6—6 of Fig. 5;

Fig. 7 is a top plan view of the rotor member prior to its being closed in position upon the stator member.

Safety catches usually consist of two relatively rotatable members, one member being attached to the article on which the catch is to be assembled, and the other member positioned to rotate on this member. The rotatable member is usually provided with a handle for manipulating the same, and this handle engages some abutment so that the slots in the two members will align for the reception of the pin stem. It has been common practice in the making of safety catches to locate the handle at some arbitrary point about the member which has been most convenient for the engagement with an abutment to cause the slots to align. Such an arbitrary location requires that the rotor always be assembled with one certain face in a particular location that this alignment may occur, and those assembling catches of this sort must be careful that this arrangement be had in order that the assembly may be proper and the safety catch operate. It frequently occurs that the assembler overlooks this fact and the catches are assembled incorrectly, and in many cases are destroyed or considerable additional labor must be employed in order to reverse the position of the rotor. In order to avoid such care, I have so formulated the rotor that its handle is diametrically opposite its slot and the entire rotor is symmetrical with reference to a central line through the slot and handle so that either side of the rotor may be placed on one or the other side of the catch with reference to the member upon which it rotates; and, as both sides are the same, the operator does not have to exercise any choice. Further, under such conditions, a machine may be utilized for the assembly; and the following is a more detailed description of the present embodiment of this invention, illustrating the preferred means by which these advantageous results may be accomplished:

With reference to the drawing, 10 designates the stator member and 11, the rotor member, of a safety catch. The stator member in the particular illustration here shown is of blade-like formation having a shank 12 with a hook-shaped portion 13 providing an opening 14 and a slot 15 into this opening, the inner edge 16 of the opening providing a bearing for portions of the rotor member. Any suitable attaching base may be provided on this blade, such, for instance, as the protrusion of the stock 17 centrally from one side of the blade and the bending of the arms 18 at the ends of the blade in the other direction or toward the other side thereof so that this stator will stand upon its edge 19 in upright position.

The rotor 11 consists of a pair of ears 20, 20 with protuberances 21 extending therefrom and joined together as at 22 as by folding of the stock. This double protuberance 21 provides a handle by which the rotor member may be operated. Trunnions 23 extend inwardly from the ears 20 into the openings 14 and their surfaces 24 engage the edge 16 upon which the same bears. Thus, the rotor 11 may rotate about the center of the opening 16 and be manually operated by the handle 21.

An abutment 25 extends from the shank of the stator member 10 to be engaged by the handle 21 to limit its rotation in one direction; and at the time of such engagement, the slot 26 of the rotor will register with the slot 15 of the stator member so that the pin stem may be received through these slots into the opening 27 in the rotor and 14 in the stator, after which the rotor by means of its handle may be moved clockwise, see Fig. 1, until its handle 21 engages the shank as at 28 with the position of the rotor as shown in Fig. 2 in its locked position.

The handle 21 is located diametrically opposite the slot 26 in the rotor so that a center line through the handle 21 and its notch 29 will also pass centrally through the slot 26 such, for instance, as indicated by the section line 6—6 in Fig. 5. All parts of the rotor on one side of this section line 6—6 in Fig. 5 are the same as the parts on the other side of this section line; and thus, it is immaterial which of the ears 20 is located on the side of the blade having the protuberance 17, which we may call the face of the catch, and which of the ears is located on the opposite side thereof, these ears being both the same; thus, such assembly may be performed by machine operations.

The foregoing description is directed solely towards the construction illustrated, but I desire it to be understood that I reserve the privilege of resorting to all the mechanical changes to which the device is susceptible.

I claim:

1. One member of a safety catch for assembly with another companion member, comprising a pair of ears each having a bearing portion for rotatably supporting the same in the companion member and provided with an axial opening through said bearing portion, said ears being both provided with a slot extending through each bearing to said opening, and a handle joining said ears and located diametrically opposite said slots, each ear being alike and each symmetrical with respect to a center line through said handle and slot whereby assembly with a companion member may be had with either of the two ears on one side of the companion member.

2. A safety catch comprising two members one member having two ears and the other member having a single ear sandwiched between said two ears, both of said members having an opening providing a hollow center for the reception of a pin stem, said members having interfitting parts for rotation one relative to the other, one member having a slot leading to the hollow center for the passage of a pin stem therethrough, the other member having a handle for rotative manipulation and a preformed slot leading to the hollow center with said slot located diametrically opposite said handle for the passage of a pin stem when by relative rotation it is in registry with the slot of the other member, the distance from each of the outside abutting edges of the handle to the nearest edge of the slot being the same, whereby to provide a symmetrical arrangement of the member for assembly and stop means comprising parts on each member for engagement for governing the rotation of said members to provide for registration of the said slots in certain positions of relative rotation.

EUGENE MOREHOUSE.